United States Patent [19]

Roberts et al.

[11] 4,348,304

[45] Sep. 7, 1982

[54] CRACKING PROCESS AND CATALYST FOR SAME

[75] Inventors: John S. Roberts; Brent J. Bertus; Dwight L. McKay, all of Bartlesville, Okla.

[73] Assignee: Phillips Petroleum Company, Bartlesville, Okla.

[21] Appl. No.: 209,076

[22] Filed: Nov. 21, 1980

Related U.S. Application Data

[62] Division of Ser. No. 26,504, Apr. 3, 1979, Pat. No. 4,256,564.

[51] Int. Cl.³ .................... B01J 29/06; B01J 23/08
[52] U.S. Cl. ................................................ 252/455 Z
[58] Field of Search .................................... 252/455 Z

[56] References Cited

U.S. PATENT DOCUMENTS

| | | | |
|---|---|---|---|
| 2,901,419 | 8/1959 | Brill | 252/411 R |
| 4,238,367 | 12/1980 | Bertus et al. | 252/455 Z |
| 4,242,233 | 12/1980 | Ball et al. | 252/455 Z |

*Primary Examiner*—Carl F. Dees

[57] ABSTRACT

A novel cracking catalyst, a method of preparing same, and an improved hydrocarbon cracking process are provided wherein the adverse effects of metals such as nickel, vanadium, iron, copper, and cobalt on the cracking catalys are reduced by contacting the cracking catalyst with a sufficient amount of at least one indium modifier selected from the group consisting of elemental indium and indium compounds free of the element antimony.

18 Claims, No Drawings

CRACKING PROCESS AND CATALYST FOR SAME

This application is a divisional of copending application Ser. No. 026,504, filed Apr. 3, 1979 and now U.S. Pat. No. 4,256,564.

Hydrocarbon feedstock containing higher molecular weight hydrocarbons is cracked by contacting it at an elevated temperature with a cracking catalyst whereby distillates such as gasoline and higher-boiling hydrocarbon fuels, e.g., kerosene, diesel fuel, burning oils and the like, are produced. However, the cracking catalyst gradually deteriorates during this process. One reason for this deterioration is the deposition of contaminating metals such as nickel, vanadium, iron, copper and cobalt on the catalyst, resulting in increased production of hydrogen and coke and decreased catalyst activity for cracking. Furthermore, the conversion of hydrocarbons into gasoline and higher-boiling hydrocarbon fuels is reduced by these metals. Therefore, there is a need for a cracking process or a modified cracking catalyst which will prevent or reduce the deleterious effects of these metal contaminants.

It is thus an object of the present invention to provide an improved catalytic cracking process.

Another object of this invention is to provide a process for the passivation of contaminating metals deposited on a cracking catalyst.

Another object of this invention is to provide a process for restoration of used cracking catalyst.

Another object of this invention is to provide a modified cracking catalyst.

Another object of this invention is to provide a cracking catalyst which provides high yields and selectivity for gasoline or higher-boiling hydrocarbon fuel, e.g., kerosene, diesel fuel or burning oil.

Other aspects, objects and the several advantages of the invention will be readily apparent to one skilled in the art from a reading of the following disclosure and the appended claims.

In accordance with the present invention the adverse effects of nickel, vanadium, iron, copper, and/or cobalt or other similar contaminating metals can be reduced by contacting the cracking catalyst with a sufficient amount of at least one modifier selected from the group consisting of elemental indium and indium compounds free of the element antimony.

The indium modifier can be employed in any amount which is sufficient to reduce the deleterious effects that metals such as nickel, vanadium, iron, copper, and cobalt have on the activity of cracking catalysts. Generally, the modifier is used in such an amount as to provide about 0.005 to about 8 weight percent, preferably about 0.01 to 2 weight percent, of indium on the catalyst, this percentage being based on the weight of the catalyst prior to the addition of the indium modifier.

By the addition of the indium modifier to the cracking catalyst in accordance with the present invention either prior to, during or after its use in the cracking of feed containing catalyst contaminating metals is achieved at least one of an increase in catalyst activity, an increase in yield of gasoline or higher-boiling hydrocarbon fuels, e.g., kerosene, diesel fuel, burning oils or the like, a decrease in the production of coke and a decrease in the production of hydrogen.

In accordance with one embodiment of this invention, a novel cracking catalyst is provided that has been prepared by contacting a conventional cracking catalyst with indium modifier in an amount and in a manner as herein described.

The term "cracking catalyst" as used herein refers to either new or used cracking catalyst materials that are useful for cracking hydrocarbons in the absence of added hydrogen. A list of typical cracking catalysts is set forth in column 4, line 30 through column 5, line 40 of U.S. Pat. No. 3,408,286. The cracking catalyst referred to can be any conventional cracking catalyst. The term "unmodified cracking catalyst" as used herein means any cracking catalyst which has not been modified by contact with indium modifier.

Such cracking catalyst materials can be any of those cracking catalysts conventionally employed in the catalytic cracking of hydrocarbons boiling above 400° F. (204° C.) for the production of gasoline, motor fuel blending components and light distillates. These conventional cracking catalysts generally contain amorphous silica or silica-alumina. Such materials are frequently associated with zeolitic materials, i.e. aluminosilicate zeolites. These zeolitic materials can be naturally occurring, or they can be produced by conventional ion exchange methods such as to provide metallic ions which improve the activity of the catalyst. Zeolite-modified silica-alumina catalysts are particularly applicable in this invention. The term zeolite is used herein is intended to include those crystalline aluminosilicates that contain sodium or calcium cations and in addition those crystalline aluminosilicates that have had sodium or calcium cations replaced with other suitable metal cations.

Examples of cracking catalysts into or onto which indium modifier can be incorporated include hydrocarbon cracking catalysts obtained by admixing an inorganic oxide gel with an aluminosilicate, and aluminosilicate compositions which are strongly acidic as a result of treatment with a fluid medium containing at least one rare earth metal cation and a hydrogen ion, or ion capable of conversion to a hydrogen ion. The catalytic cracking material employed will prior to use in cracking generally be in particulate form having a particle size principally within the range of about 10 to about 200 microns.

If desired, the cracking catalyst can contain a combustion promoter such as platinum or chromium.

The unused catalytic cracking material as employed in the present invention contains essentially no nickel, vanadium, iron, copper or cobalt. Particularly and preferably, the nickel, vanadium, iron and copper metals content of the unused catalytic cracking material which constitutes the major portion of the unused cracking catalyst of this invention is defined by the following limits:

| nickel | 0 to 0.02 weight percent |
| vanadium | 0 to 0.06 weight percent |
| iron | 0 to 0.8 weight percent |
| copper | 0 to 0.02 weight percent |

The weight percentages in this table relate to the total weight of the unused catalytic cracking material including the metals nickel, vanadium, iron and copper, but excluding the added indium modifying agents. The contents of these metals on the cracking catalyst can be determined by standard methods well known in the art, e.g., by atomic absorption spectroscopy or by X-ray fluorescence spectroscopy.

The catalytic cracking materials can vary in pore volume and surface area. Generally, however, the unused cracking catalyst will have a pore volume in the range of about 0.1 to about 1 ml/g. The surface area of this unused catalytic cracking material generally will be in the range of about 50 to about 500 m$^2$/g.

The modified catalyst of this invention comprises a conventional cracking catalyst having a modifying or passivating amount of indium modifier therein or thereon. The quantity of indium modifier employed is generally such that about 0.005 to about 8, preferably about 0.01 to about 2, weight percent indium is deposited on the catalyst, these percentages being based on the weight of cracking catalyst prior to treatment with indium modifier. The amount of indium which is most desirable on the catalyst will vary according to the effective level of contaminating metals on the catalyst, with higher values of indium being desirable for higher effective values of contaminating metals.

The manner in which the conventional cracking catalyst is contacted with indium modifier is not critical. For example, the indium-containing material in finely divided form can be mixed with the conventional cracking catalyst in ordinary manner such as rolling, shaking, stirring or the like. Alternatively, the indium modifier can be dissolved or dispersed in a suitable liquid, e.g., water, hydrocarbon or aqueous acid, depending in part on the particular modifying agents used, and the resulting solution or dispersion can be used to impregnate the conventional cracking catalyst, followed by volatilization of the liquid, or the indium modifier can be precipitated onto the catalyst from solutions of the treating agents in different chemical form, followed by solvent removal. If desired, the indium-containing material can be dissolved or dispersed in the hydrocarbon feedstock to the cracking process, in which instance the hydrocarbon feedstock and the modifying agent contact the cracking catalyst at about the same time. Also, if desired, the cracking catalyst can be exposed to a vapor form of the indium-containing material to deposit the agents on the catalyst. Of course, combinations of the various methods can be employed to achieve modification of the catalyst.

The indium compounds included within the scope of this invention as indium modifiers include any suitable indium compounds not containing the element antimony. Suitable compounds of indium include, for example, the indium oxides $In_2O_3$, $InO$, and $In_2O$; the indium sulfides, $In_2S_3$, $InS$, and $In_2S$; indium selenide; indium telluride; indium hydroxide; indium arsenide; indium phosphate; indium nitrate; and indium sulfate. Effective but less preferable indium compounds include indium perchlorate and the indium halides $InX_3$, $InX_2$, and $InX$ where X can be chlorine, bromine, or iodine. These indium compounds are less preferred because of the corrosive effect that such halogen compounds generally have on metal process equipment. Suitable organic indium compounds can also be employed. And as indicated elemental indium can be utilized as a modifier if desired.

Since the main purpose of the indium modifier on the catalytic cracking material is to reduce the otherwise occurring undesirable effects of contaminating metals, in particular, the increased hydrogen and coke production and the reduced yields of gasoline or higher-boiling hydrocarbon fuels such as kerosene, diesel fuel, and burning oils caused by these contaminating metals, the sources of indium modifier utilized and incorporated into or onto the cracking catalyst should be essentially free of such contaminating metals. The indium modifier sources thus should contain essentially no nickel, no vanadium, no iron, no copper and no cobalt or other detrimental contaminating metal.

Prior to or during use in the hydrocarbon cracking process the indium modified catalyst should be heated to an elevated temperature, e.g., within the range of about 800° F. (426° C.) to about 1500° F. (816° C.), in an oxidizing or reducing atmosphere. The purpose of the heating is to activate the catalyst. Such heating can occur in the catalytic cracker, in the catalyst regenerator, or in a vessel separate from the catalytic cracker or catalyst regenerator. Thus the indium modified catalyst can be prepared from used or new conventional cracking catalyst by admixing this conventional catalyst with at least one suitable indium modifier as above-identified in the presence or absence of a diluent, with removal of the diluent, if employed, with or without heating to an elevated temperature prior to being used in the cracking process, and the resulting catalyst can be added as make-up catalyst for the cracking process, this make-up catalyst preferably being added to the catalyst regenerator. In a preferred process the indium modifier as such or preferably dissolved or dispersed in a suitable liquid, is added to the oil feedstock as the feedstock is charged to the catalytic cracker, the treating agents being added at such a rate as to maintain the concentration of indium in or on the catalyst generally within the range of about 0.005 to about 8, preferably in the range of about 0.01 to about 2 weight percent, these percentages being based on the weight of cracking catalyst prior to treatment with indium modifier. The addition of indium modifier can be continuous or intermittent.

In accordance with a further embodiment of this invention there is provided a process for restoring used cracking catalyst by passivating contaminating metals selected from the group consisting of nickel, vanadium, iron, copper and cobalt which process comprises contacting the contaminated cracking catalyst under an elevated temperature with at least one indium modifier as set forth above.

The time during which the catalyst is contacted with the modifier is not critical. Generally the time for a batch treatment of the catalyst as with a solution of at least one modifier outside of the reaction zone is in the range of from 0.1 to 300 minutes. In a presently preferred embodiment, the indium modifier is continuously metered into the cracking reactor by being introduced into the feedstock before the feedstock is passed to the reaction zone.

In accordance with a still further embodiment of this invention, there is provided an improved cracking process wherein hydrocarbon feedstock is contacted under cracking conditions with a modified cracking catalyst which comprises a modifying amount of indium modifier as defined above. For this embodiment, too, the preferred details concerning the modified cracking catalyst disclosed above apply. Thus, the preferred modified cracking catalyst is one that is obtained by mixing a cracking catalyst with the indium modifier and subjecting the modified catalyst to temperature conditions in the range of about 800° F. (426° C.) to about 1500° F. (816° C.). Most preferably, the initial high-temperature treatment of the cracking catalyst-treating agent mixture is carried out under reducing conditions.

Advantageously, and in accordance with a still further embodiment of this invention, indium modifier is added to the feedstock entering the cracking zone for contact with the cracking catalyst. By this procedure the contacting of the cracking catalyst and indium modifier and the initial treatment under elevated temperatures are done under the reducing conditions prevailing in the catalytic cracker.

The cracking process in which the indium-containing cracking catalyst is employed is basically an improvement over a conventional cracking process which employes a conventional cracking catalyst alone. Although the indium-containing cracking catalyst can be employed in a catalytic cracking process employing a fixed catalyst bed, it is especially useful in a fluid catalytic cracking process.

A preferred embodiment of the cracking process of this invention utilizes a cyclic flow of catalyst from a cracking zone to a regeneration zone. In this process, a hydrocarbon feedstock containing contaminating metals such as nickel, vanadium or iron is contacted in a cracking zone under cracking conditions and in the absence of added hydrogen with indium-containing cracking catalyst as defined above; a cracked product is obtained and recovered; the cracking catalyst is passed from the cracking zone into a regeneration zone; and in the regeneration zone the cracking catalyst is regenerated by being contacted with a free oxygen-containing gas, preferably air. The coke that has been built up during the cracking process is thereby at least partially burned off the catalyst. The regenerated cracking catalyst is reintroduced into the cracking zone.

Furthermore, it is preferred in carrying out the cracking process of this invention to replace a fraction of the total cracking catalyst with unused cracking catalyst continuously or intermittently. Generally, about 0.5 to about 6 weight percent of the total cracking catalyst is replaced daily by fresh cracking catalyst. The actual quantity of the catalyst replaced depends in part upon the nature of the feedstock used. The make-up quantity of cracking catalyst can be added at any location in the process. Preferably, however, the cracking catalyst that is make-up catalyst is introduced into the regenerator in a cyclic cracking process.

Also, it is to be understood that the used cracking catalyst coming from the cracking zone, before introduction into the regenerator, is stripped of essentially all entrained liquid or gaseous hydrocarbons. Similarly, the regenerated catalyst can be stripped of any entrained oxygen before it reenters the cracking zone. The stripping is generally done with steam.

The specific conditions in the cracking zone and in the regeneration zone are not critical and depend upon several parameters, such as the feedstock used, the catalyst used, and the results desired. Preferably and most commonly, the cracking and regeneration conditions are within the following ranges:

| Cracking Zone | |
|---|---|
| Temperature: | 800°–1200° F. (427°–649° C.) |
| Time: | 1–40 seconds |
| Pressure: | Subatmospheric to 3000 psig |
| Catalyst:oil ratio: | 3:1 to 30:1, by weight |
| Regeneration Zone | |
| Temperature: | 1000°–1500° F. (583°–816° C.) |
| Time: | 240 minutes |
| Pressure: | Subatmospheric to 3000 psig |
| Air at 60° F. (16° C.) and 1 atmosphere: | 100–250 ft$^3$/lb, coke (6.2–15.6 m$^3$/kg coke) |

The feedstocks employed in the catalytic cracking process of this invention can contain metal contaminants such as nickel, vanadium, iron, copper and/or cobalt and the like. The feedstocks include those which are conventionally utilized in catalytic cracking processes to produce gasoline and light distillate fractions from heavier hydrocarbon feedstocks. The feedstocks generally have an initial boiling point above about 400° F. (204° C.) and include fluids such as gas oils, fuel oils, cycle oils, slurry oils, topped crudes, shale oils, oil from tar sands, oils from coal, mixtures of two or more of these, and the like. By "topped crude" is meant those oils which are obtained as the bottoms of a crude oil fractionator. If desired, all or a portion of the feedstock can constitute an oil from which a portion of the metal content previously has been removed, e.g., by hydrotreating or solvent extraction.

Typically the feedstock utilized in the process of this invention will contain one or more of the metals nickel, vanadium and iron within the ranges shown in the following table:

| Metal | Metal Content of Feedstocks, ppm[1] |
|---|---|
| Nickel | 0.02 to 100 |
| Vanadium | 0.02 to 500 |
| Iron | 0.02 to 500 |
| Total metals | 0.02 to 1100[2] |

[1]The ppm metal content refers to the feedstock as used. As used in this table and throughout the specification, ppm means parts per million, by weight.
[2]Total metals in this table and elsewhere refers to the sum of the nickel, vanadium and iron contents in the feedstock that are effective in contaminating the catalyst; the total metals content can be determined in accordance with methods well known in the art, e.g., by atomic absorption spectroscopy.

One of the most important embodiments of this invention resides in a heavy oil cracking process. The known commercial heavy oil cracking process is capable of cracking heavy oils having a metals contents of up to 80 ppm of total effective metals, i.e., metals in any form detrimental to the cracking process. Economically marginal results are obtained with oils having 40 to 80 ppm with total effective metals. In accordance with this invention, heavy oils with a total metals content of about 40 to 100 ppm and even those of about 100 to 200 ppm and above of total metals can be cracked in a cracking process in the absence of added hydrogen by utilizing the cracking catalyst defined above to yield gasoline and other fuels and fuel blending components. Thus, known heavy oils with total metals contents of from 80 to 300 ppm, that could not heretofore be directly used for fuel production and in particular for gasoline or higher-boiling hydrocarbon fuels production, in accordance with this invention can be cracked to yield gasoline and higher-boiling hydrocarbon fuels such as kerosene, diesel fuel and burning oils. As indicated earlier the optimum amount of indium in or on the cracking catalyst varies with the amount of contaminating metals in the feedstock. The amounts of indium generally considered useful for various levels of contaminated metals is set forth in the following table:

| Total V, Fe, Ni in Feedstock, ppm | Indium Added to Catalyst, Wt. %* |
|---|---|
| 40–100 | 0.05–0.8 |
| 100–200 | 0.1–1 |
| 200–300 | 0.15–1.5 |
| 300–800 | 0.2–2 |

*Based on the weight of catalyst prior to addition of indium passivating agent. Quantities are expressed as the element.

The invention will be still more fully understood from the following example which illustrates an embodiment of the instant invention.

EXAMPLE

A portion of a commercial cracking catalyst that had been used in a series of cracking steps was employed to evaluate the effect of indium. The catalyst, being a synthetic zeolite combined with clay, was predominantly silica and alumina. Concentration of some other elements together with pertinent physical properties are shown in Table I.

TABLE I

| Surface area, $m^2/g$ | 74.3 |
|---|---|
| Pore volume, ml/g | 0.29 |
| Composition, wt. % | |
| Nickel | 0.38 |
| Vanadium | 0.60 |
| Iron | 0.90 |
| Cerium | 0.40 |
| Sodium | 0.39 |
| Carbon | 0.06 |

A portion of this used, metals-contaminated catalyst was treated with indium as follows. To 110 g of dried catalyst was added 0.377 g of 100 mesh indium (II) sulfide, InS, purchased from Cerac/Pure, Inc., Menomonee Falls, Wis. Catalyst preparation was done in a dry, inert atmosphere because the particular indium compound chosen was moisture sensitive and would evolve hydrogen sulfide. After mixing by stirring the resulting powder was poured into a quartz tube reactor where, while being fluidized with dry nitrogen, it was heated to 482° C.; then it was fluidized with hydrogen while the temperature was raised to 649° C. At that temperature fluidization with nitrogen was continued for five minutes followed by a regeneration treatment involving 15 minutes of treatment with air at that temperature after which the catalyst was cooled to ambient temperature while being fluidized with air. The catalyst was then subjected to 10 aging cycles. Each cycle was conducted in the following manner. The catalyst at about 482° C. was fluidized with nitrogen for one minute, then heated to about 510° C. during two minutes while fluidized with hydrogen, then maintained at about 510° C. for one minute while fluidized with nitrogen, then heated to about 649° C. for 10 minutes while fluidized with air, and then cooled to about 482° C. during 0.5 minutes while fluidized with air. The aging cycles were employed to insure that the modified catalyst had been exposed to treatments comparable to those to which the untreated catalyst had been exposed in the commercial operation. After 10 such cycles the catalyst was cooled to room temperature while being fluidized with nitrogen and was then evaluated as a cracking catalyst. This catalyst contained 0.27 weight percent of added indium, based on the weight of the catalyst prior to addition of the indium compound.

The relative effectiveness of the indium-treated catalyst and the used but untreated catalyst was evaluated using a fluidized bed reactor using a gas oil as the feedstock to be subjected to cracking. The properties of the gas oil used in the cracking tests are summarized in Table II.

TABLE II

| API gravity at 25.8° C. | |
|---|---|
| Distillation (by ASTM D 1160-61) | |
| 2% | 259° C. |
| 10% | 297 |
| 30% | 354 |
| 50% | 404 |
| 70% | 450 |
| 90% | 523 |
| EMCI | 41.1 |
| Sulfur | 0.40 wt. % |
| Nitrogen | 0.07 |
| Carbon residue | 0.87 |

The cracking reactions were carried out at about 510° C. at atmospheric pressure for 0.5 minutes and the regeneration steps were conducted at about 649° C. at atmospheric pressure for about 30 minutes using fluidized air. The reactor was purged with nitrogen before and after each cracking step.

The cracking reactions with the untreated used catalyst were conducted at varying catalyst to oil ratios. The resulting data points provided curves which indicated the conversion and yields for various catalyst to oil ratios. The values from the curves for a catalyst to oil ratio of 7.7 are reported in Table III below for comparison with two runs using the treated catalyst and catalyst to oil ratios of about 7.7.

TABLE III

| Catalyst | Cat./Oil Wt. Ratio | Material Balance | Conversion (Vol. % of Feed) | Yields Gasoline, Vol. % | SCF $H_2$/bbl Feed Conv. | Coke, Wt. % |
|---|---|---|---|---|---|---|
| Untreated | 7.7 | * | 64.5 | 51.7 | 635 | 8.7 |
| In treated | 7.79 | 99.1 | 65.0 | 55.4 | 564 | 7.9 |
| In treated | 7.75 | 97.3 | 66.2 | 56.0 | 585 | 7.4 |

*Greater than 95% in all runs

Based on the average of the two runs, the catalyst treated with indium yielded 7.7% more gasoline than the untreated catalyst, while producing 9.5% less hydrogen and 12.1% less coke than the untreated catalyst.

Although several embodiments of the present invention have been disclosed herein for the purpose of illustration, it will be understood that further variations and modifications can be made without departing from the spirit and scope of the present invention as defined in the following claims.

What is claimed is:

1. A cracking catalyst composition comprising a zeolite-containing cracking catalyst containing at least one modifier selected from the group consisting of elemental indium and indium compounds free of the element antimony, said modifier being present in an amount sufficient to reduce the deleterious effect that nickel, vanadium, iron, copper, and/or cobalt have on the activity of said cracking catalyst.

2. A cracking catalyst composition according to claim 1 wherein said cracking catalyst contains essentially no nickel, vanadium, iron, copper, or cobalt.

3. A cracking catalyst composition according to claim 2 wherein said cracking catalyst comprises an aluminosilicate zeolite cracking catalyst.

4. A cracking catalyst composition according to claims 2 or 3 wherein the amount of indium in said composition is in the range of about 0.005 to about 8 weight percent based on the weight of the catalyst prior to the addition of said at least one modifier.

5. A cracking catalyst composition according to claim 4 wherein said at least one modifier is selected from the group consisting of elemental indium, indium oxides, indium sulfides, indium selenide, indium telluride, indium hydroxide, indium arsenide, indium phosphate, indium nitrate, and indium sulfate.

6. A cracking catalyst composition according to claim 4 wherein said modifier is InS.

7. A cracking catalyst composition according to claim 1 wherein said cracking catalyst contains at least one metal selected from the group consisting of nickel, vanadium, iron, copper, and cobalt.

8. A cracking catalyst composition according to claim 7 wherein said cracking catalyst comprises an aluminosilicate cracking catalyst.

9. A cracking catalyst composition according to claim 7 or 8 wherein the amount of indium in said composition is in the range of about 0.005 to about 8 weight percent based on the weight of the catalyst prior to the addition of said at least one modifier.

10. A cracking catalyst composition according to claim 9 wherein said at least one modifier is selected from the group consisting of elemental indium, indium oxides, indium sulfides, indium selenide, indium telluride, indium hydroxide, indium arsenide, indium phosphate, indium nitrate, and indium sulfate.

11. A cracking catalyst composition according to claim 9 wherein said modifier is InS.

12. A method for preparing an improved cracking catalyst comprising combining a zeolite-containing cracking catalyst with at least one modifier selected from the group consisting of elemental indium and indium compounds free of the element antimony, said at least one modifier being employed in an amount sufficient to reduce the deleterious effect that nickel, vanadium, iron, copper, and/or cobalt have on the activity of said cracking catalyst.

13. A method according to claim 12 wherein said indium modified catalyst is heated at a temperature in the range of about 427° C. to about 816° C. in the presence of an oxidizing or reducing atmosphere.

14. A method according to claim 13 wherein said cracking catalyst contains at least one metal selected from the group consisting of nickel, vanadium, iron, copper, and cobalt.

15. A method according to claim 14 wherein the amount of indium in said composition is in the range of about 0.005 to about 8 weight percent based on the weight of the catalyst prior to the addition of said at least one modifier.

16. A method according to claim 15 wherein said cracking catalyst comprises an aluminosilicate zeolite cracking catalyst.

17. A method according to claim 16 wherein said at least one modifier is selected from the group consisting of elemental indium, indium oxides, indium sulfides, indium selenide, indium telluride, indium hydroxide, indium arsenide, indium phosphate, indium nitrate, and indium sulfate.

18. A method according to claim 17 wherein said modifier is InS.

* * * * *